(12) United States Patent
Sands

(10) Patent No.: US 6,817,750 B1
(45) Date of Patent: Nov. 16, 2004

(54) INDIVIDUALIZED BLENDER

(75) Inventor: Lenny Sands, Encino, CA (US)

(73) Assignee: Homeland Housewares, LLC, Los Angeles, CA (US)

(*) Notice: Subject to any disclaimer, the term of this patent is extended or adjusted under 35 U.S.C. 154(b) by 0 days.

(21) Appl. No.: 10/649,757

(22) Filed: Aug. 26, 2003

(51) Int. Cl.[7] .......................... A47J 43/046; A47J 43/06
(52) U.S. Cl. .......................... 366/205; 366/206; 99/513
(58) Field of Search ................................ 366/199, 205, 366/206, 314; 99/513; 241/282.1, 282.2

(56) References Cited

U.S. PATENT DOCUMENTS

| | | | | |
|---|---|---|---|---|
| 1,480,914 | A | * | 1/1924 | Poplawski .................. 366/314 |
| 2,304,476 | A | * | 12/1942 | Poplawski .................. 241/282.2 |
| 2,530,455 | A | | 11/1950 | Forss |
| RE24,607 | E | * | 2/1959 | Seyfried |
| 3,064,949 | A | | 11/1962 | Dewenter |
| 3,612,126 | A | * | 10/1971 | Emmons et al. |
| 3,704,864 | A | | 12/1972 | Lee |
| 3,881,705 | A | * | 5/1975 | Greenspan .................. 241/282.2 |
| 3,970,258 | A | | 7/1976 | Mantelet |
| 4,111,372 | A | | 9/1978 | Hicks et al. |
| 4,487,509 | A | | 12/1984 | Boyce |
| D281,945 | S | | 12/1985 | Boyce |
| 4,708,487 | A | | 11/1987 | Marshall |
| 4,714,203 | A | | 12/1987 | Williams |
| 4,723,719 | A | | 2/1988 | Williams |
| 4,889,248 | A | * | 12/1989 | Bennett |
| 5,639,161 | A | * | 6/1997 | Sirianni .................... 366/314 |
| 5,662,032 | A | * | 9/1997 | Baratta ..................... 99/513 |
| 5,690,021 | A | * | 11/1997 | Grey ........................ 99/513 |
| 5,720,552 | A | * | 2/1998 | Schindlegger |
| 5,882,113 | A | | 3/1999 | Binder |
| 5,911,504 | A | | 6/1999 | Schindlegger, Jr. |
| 6,065,861 | A | * | 5/2000 | Chen |
| 6,135,019 | A | * | 10/2000 | Chou ........................ 99/513 |
| 6,223,652 | B1 | * | 5/2001 | Calia et al. ................ 99/513 |
| D487,668 | S | * | 3/2004 | Sands |
| 6,758,592 | B2 | * | 7/2004 | Wulf et al. ................. 366/205 |
| 2001/0036124 | A1 | * | 11/2001 | Rubenstein ................. 366/205 |
| 2002/0012288 | A1 | * | 1/2002 | Masip et al. ............... 366/205 |
| 2003/0213373 | A1 | * | 11/2003 | Dickson, Jr. ............... 366/205 |
| 2003/0214875 | A1 | * | 11/2003 | Dickson, Jr. ............... 366/206 |

FOREIGN PATENT DOCUMENTS

| | | | |
|---|---|---|---|
| DE | 19602147 A1 | * | 7/1997 |
| EP | 0562310 A1 | * | 9/1993 |
| JP | 5-199944 | * | 8/1993 |
| JP | 6-319656 | * | 11/1994 |
| JP | 9-65988 | * | 3/1997 |
| JP | 10-117944 | * | 5/1998 |

(List continued on next page.)

*Primary Examiner*—Charles E. Cooley
(74) *Attorney, Agent, or Firm*—Cislo & Thomas LLP

(57) ABSTRACT

A blender system composed of a mixing base that is capable of agitating the contents of a plurality of containers. The mixing base includes a member for rotating a shaft, a recessed well positioned at a top of the mixing base, a pressure-actuated switch positioned about the periphery of the recessed well, and a locking groove. One container that may be used with the mixing base is a bullet-shaped container. The bullet-shaped container includes a body, a selectively removable container base, the container base sized to fit into the recessed well of the mixing base, the container base comprising a member for agitating contents of the bullet-shaped container and a member for locking the bullet-shaped container within the recessed well of the base. Alternatively, a blender container may be utilized with the mixing base. The blender container includes a body, a selectively removable blender base, wherein the blender base sized to fit into the recessed well of the base, the blender container comprising a member for agitating contents of the blender container, an element for sieving the contents of the blender container, and a member for locking the blender container within the recessed well of the base.

6 Claims, 5 Drawing Sheets

FOREIGN PATENT DOCUMENTS

| | | | | |
|---|---|---|---|---|
| JP | 11-137454 | * | 5/1999 |
| JP | 2000-201837 | * | 7/2000 |
| JP | 2000-201838 | * | 7/2000 |
| JP | 2002-177155 | * | 6/2002 |
| JP | 2002-291627 | * | 10/2002 |
| JP | 2002-336139 | * | 11/2002 |
| JP | 2003-259995 | * | 9/2003 |
| JP | 2004-16693 | * | 1/2004 |
| WO | 03/003888 A1 | * | 1/2003 |
| WO | 03/005871 A1 | * | 1/2003 |
| WO | 03/075726 A1 | * | 9/2003 |

* cited by examiner

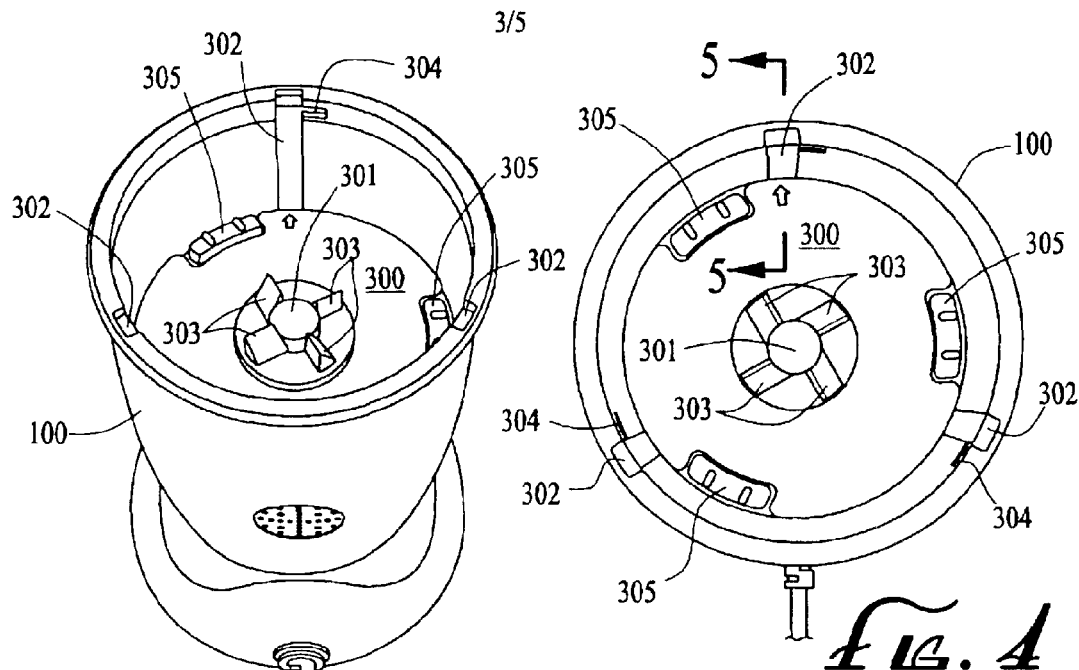
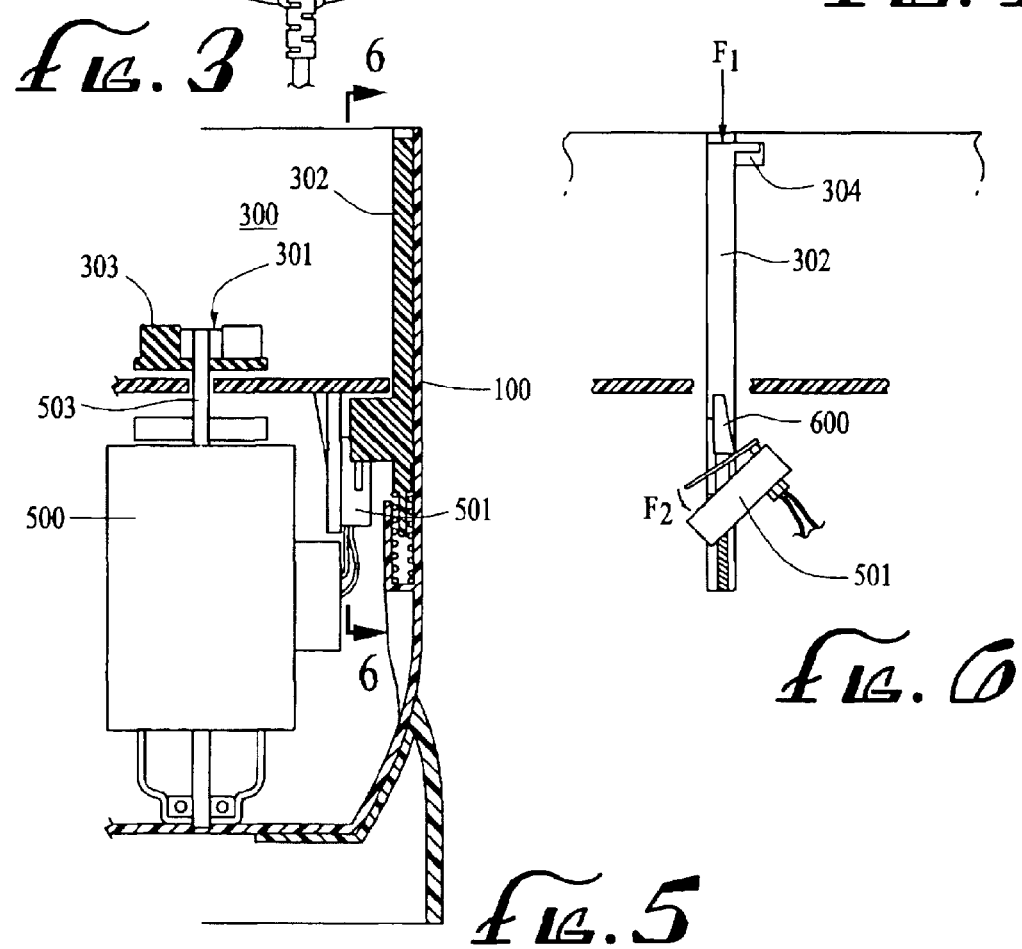

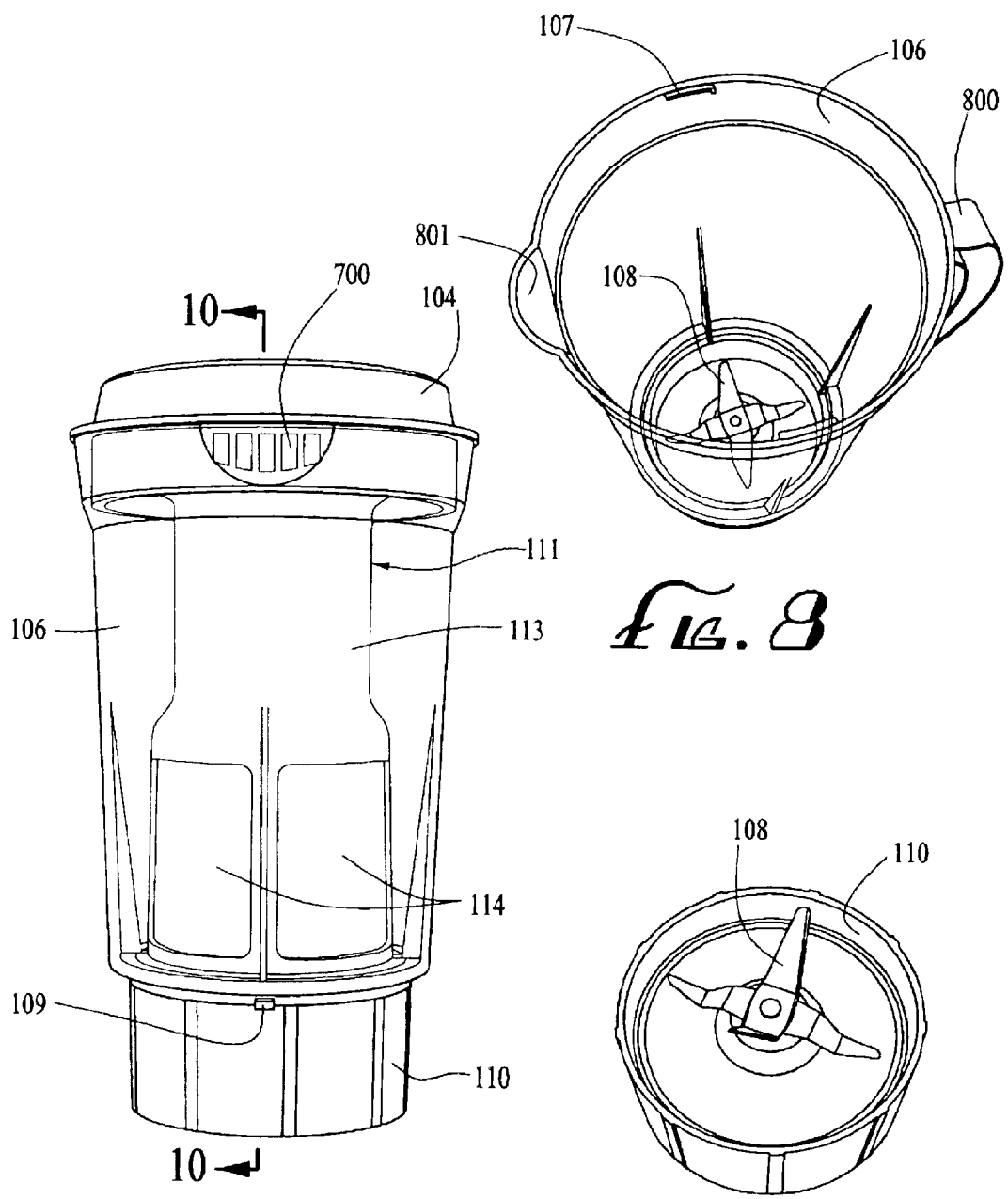

INDIVIDUALIZED BLENDER

BACKGROUND

Various devices for blending various liquids and solids have been developed over the years. These devices have various features and options to suit a wide variety of uses and applications. For example, there are many blenders that are either handheld or freestanding devices. While these devices have been useful, these prior art devices can be difficult to clean, use and store unused products, especially, when preparing smaller batches. More specifically, freestanding devices can be too large and cumbersome to use to make smaller portions and are generally better designed for blending larger quantities of fluids and ingredients. Handheld units may be useful to make individualized portions, but they may lack the power to properly blend ingredients together. Furthermore, these handheld units are generally used with open containers such as bowls or cups that can increase the chances of spilling or splattering during preparation of the ingredients. Moreover, the unused portion would have to be is poured out of the open container and into a sealable container to be stored or to be readily carried by a person. Accordingly, there remains a need for an individualized blender system that may be easier to use, clean and store unused products.

SUMMARY OF THE INVENTION

Exemplary embodiments disclosed here are directed to an individualized blender system. According to one exemplary embodiment, the blender system is composed of a base including a motor means, an individual-sized container and a combination blender and/or juicer canister. The base includes a body, a motor means, an agitating means coupled to the motor, a recessed well for receiving a container and a pressure-sensitive switch that selectively powers the motor means. In use, the container or canister may be placed on the base, pressure is applied to the container or canister thereby activating the motor means and agitating the contents of the container or canister. The base also includes a locking groove that permits the user to lock the container or canister on the base while keeping the motor means in the powered position.

According to one exemplary embodiment, the individually sized container may be bullet-shaped. In alternate embodiments, the container may have a cylindrical, polygonal, cubical, or pyramidal shape. Also, the container may be sealed with a simple cap or a cap having an agitating means. The container may also include a plurality of ridges that form a stable platform for standing the container like a typical drinking vessel. That is, the bullet-shape container may be inverted so that the container rests on the ridges, and the cap is readily accessible. Additionally, the container may include locking members that engage the locking grooves provided on the blender base.

According to one exemplary embodiment, the blender canister includes, at a minimum, a body, a selectively removable base having an agitating means, locking members that engage the locking grooves provided on the blender base and a selectively removable means for sieving the container contents. In use, with the sieving means provided in the body of the blender canister, fruits and vegetables may be placed and blended within the bore of the sieving means. The pulp remaining from the fruits and vegetables remain the bore of the sieving means and the resultant juice may be decanted from the blender canister. Alternatively, the blender canister may be used without the removable means for sieving the container contents.

BRIEF DESCRIPTION OF THE DRAWINGS

FIG. 3 is a perspective view of an exemplary embodiment of a blender base;

FIG. 4 is a top plan view of FIG. 3;

FIG. 5 is a cross-sectional view of an exemplary embodiment of a blender base taken along line 5—5 of FIG. 4;

FIG. 6 is a cross-sectional view of an exemplary embodiment of a blender base taken along line 66 of FIG. 5;

FIG. 7 is a side view of an exemplary embodiment of a blender container;

FIG. 8 is a perspective view of an exemplary embodiment of a blender container;

FIG. 9 is a perspective view of an exemplary embodiment of blender container base.

DETAILED DESCRIPTION

The detailed description set forth below in connection with the appended drawings is intended as a description of exemplary embodiments and is not intended to represent the only forms in which the exemplary embodiments may be constructed and/or utilized.

Figure 1:
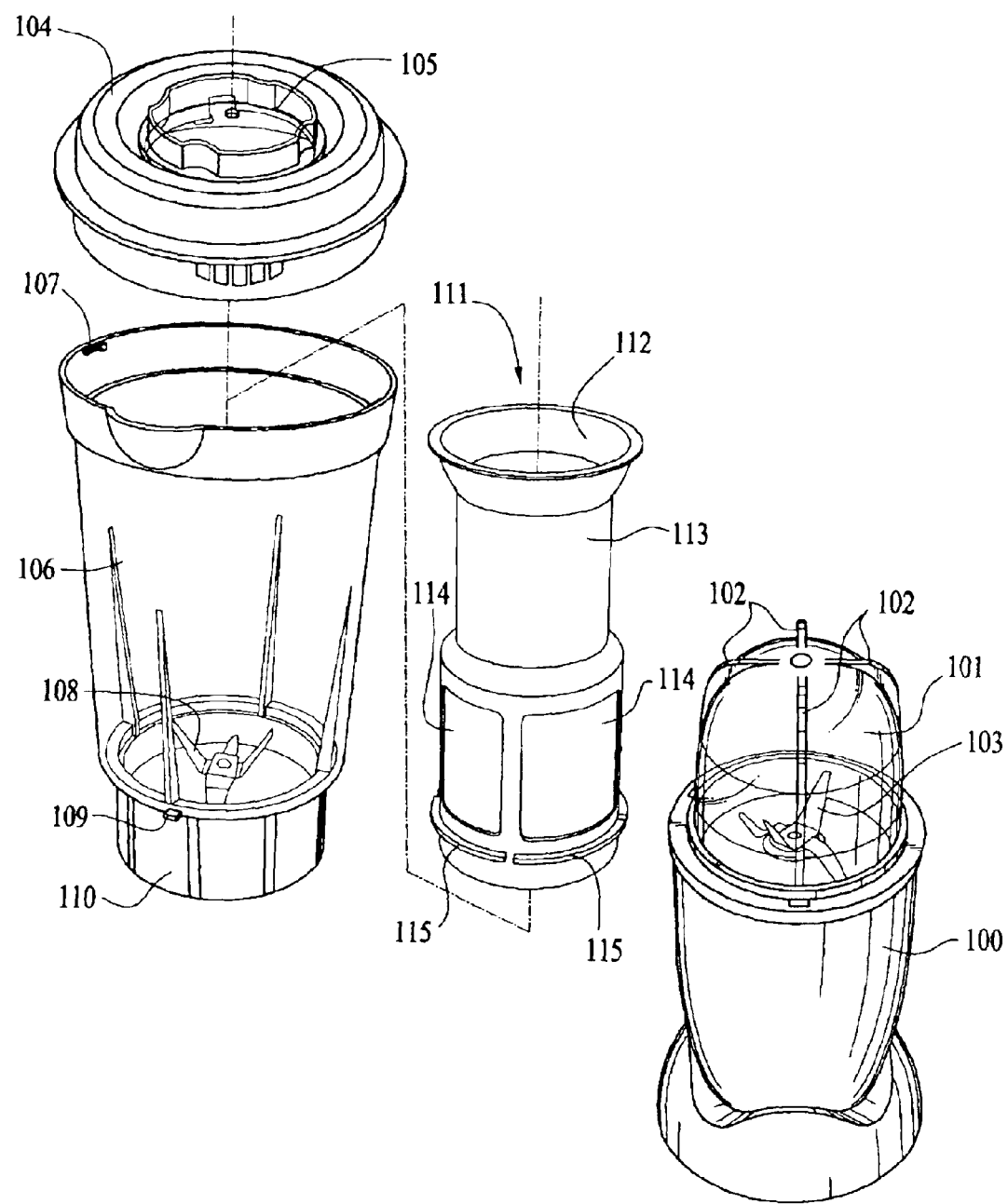
FIG. 1 is a perspective view of an exemplary embodiment of the blender system.

Turning to the drawings, FIG. 1 is directed to an exemplary embodiment of an individualized blender system. More specifically, FIG. 1 shows a container 101 engaged to a blender base 100 and a blender container 106. As shown in the exemplary embodiment of FIG. 1, the container 101 is a bullet-shaped container. As those skilled in the art will appreciate, the container 101 may have a plurality of shapes known or developed in the art. Also, the container 101 may include a plurality of ridges 102 provided on the outer surface of the container 101. The container 101 also includes a means 108 for agitating the contents of the container. The means for agitating the container contents can be a blade element coupled to an impeller in a shaft or other transmission means. The blade element may have one, two, three, four, or more cutting elements. The cutting elements are generally flat members that may have sharpened edges, pointed tips, and one or more bends along the surface of the cutting elements.

The blender container 106 also includes a base 110, selectively removable lid 104, 105, and a base member 110 that is coupled to an agitating means 108. As shown in FIG. 1, the lid is composed of two components, but it is contemplated that a one-piece or multi-piece cap may also be used. The lid 104 may be locked on to the opening of the container 106 via a cap-locking member 107. The cap-locking member 107 may be an L-shaped ridge located at the lip of the container 106. The cap-locking member 107 engages a corresponding member (not shown) on the lid 104 in order to securely fix the lid 104 to the container 106.

According to one exemplary embodiment, the blender container 106 may include a juicer member 111. The juicer element 111 is composed of a main body 113 and a plurality of sieve elements 114 spaced about the periphery of the main body 113. According to the exemplary embodiment depicted in FIG. 1, the juicer element 111 may also include a funnel 112 at one end of the main body 113. Additionally, the juicer element 111 may also include an annular stop member 115 positioned at one end of the juicer so as to prevent over-insertion of the juicer element 111 into the blender container 106.

Figure 2A:
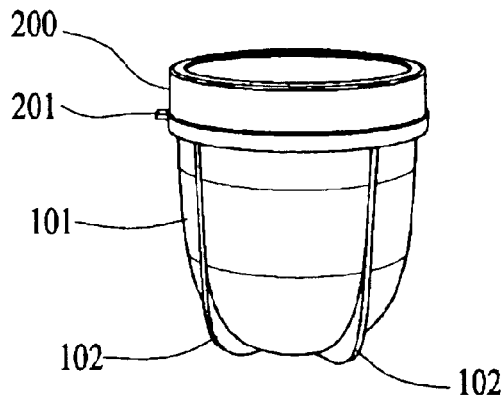
FIG. 2A is a perspective view of an exemplary embodiment of an individualized blender container.
Figure 2B:
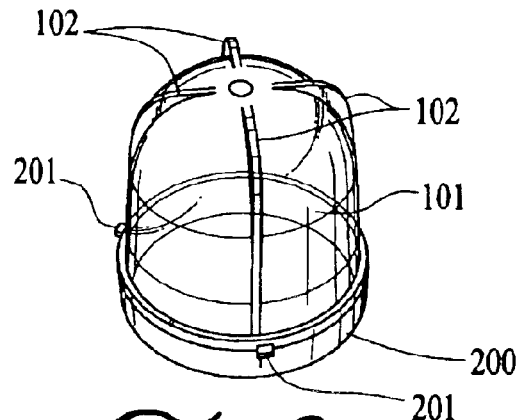
FIG. 2B is an exploded Perspective view of FIG. 2A.
Figure 2C:
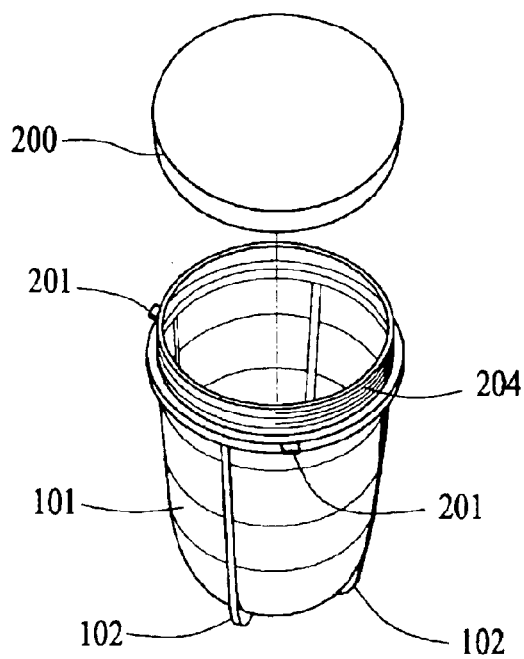
FIG. 2C is an inverted perspective view of FIG. 2A.

FIGS. 2A through 2C illustrate various views of the individualized container 101. That is, an individualized container 101 is sized for smaller servings that would be prepared/consumed by one and/or a few individuals. As shown in FIG. 2A, the container 101 is resting on external ridges 102. The external ridges 102 are shaped so as to permit the container 101 to rest on the apex of the container 101 without tipping over. As those skilled in the art will appreciate, the number of ridges may be varied from what is depicted so long as the container can stand upright on a substantially flat surface. As shown in FIG. 2A, the container 101 may be used as a drinking vessel. That is, an individual may blend contents of the container 101, remove the container 101, base 100, access the contents of the container, and secure the cap 200 onto the container 101 to store for later use.

Figure 2D:
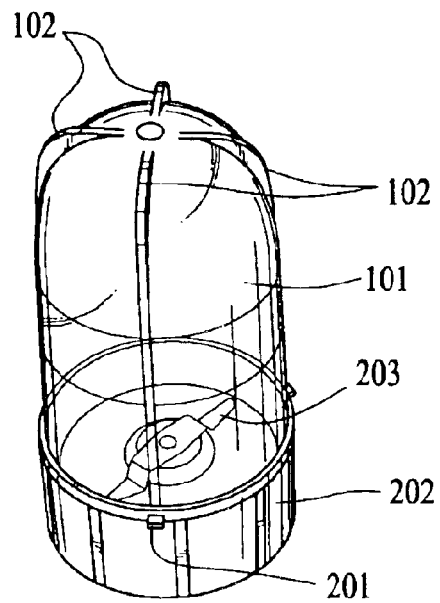
FIG. 2D is a perspective view of another exemplary embodiment of an individualized blender container.

In one configuration, the container 101 may be also enclosed with a cap 200. In an alternate configuration, the container may be enclosed with a base having an agitating means as shown in FIG. 2D. As shown in FIG. 2C, the cap 200 may be affixed to the opening of the container 101 by threads 204. As those skilled in the art will appreciate, the cap 200 may be secured to the container 101 by various known and developed means such as, but not limited to, a friction fit or a snap-fit. As shown in FIG. 2B, the container 101 is inverted and may rest on the cap 200.

FIG. 2D illustrates an alternate embodiment of the container 101 having a larger volume as compared to the embodiments depicted in FIGS. 2A–2C. Also, the base 202 includes another exemplary embodiment of an agitating means 203. Additionally, as shown in FIGS. 2A through 2C, the container 101 includes locking members 201 that are spaced about the periphery of the container 101. The locking members 201 allow the user to operate the blender without requiring the constant application of force to the container (in order to keep the motor means switched on).

FIG. 3 is directed to the base 100 and the various components that are associated with the base's recessed well 300. The base 100 includes a motor means (not shown) that is coupled to an impeller 301. The impeller 301 includes a plurality of blades 303 that radiate from the center of the impeller 301. Along the periphery of the recessed well 300, a plurality of bushings 305 may be placed about the periphery of the recessed well 300. In another exemplary embodiment of the base 100, the base does not include the bushings 305. The bushings 305 may be made from a generally resilient material such as, but not limited to, rubber or silicone that may serve to reduce the vibrations during the agitation of the container contents. Also, as shown in FIG. 3, the recessed well 300 includes a plurality of pressure-activated switches 302. In use, the weight of the container 101 or the blender container 106 causes the downward movement of the switch 302 thereby activating the motor means. As shown in FIG. 3, a locking groove 304 may be provided adjacent to the switch 302. Accordingly, in use, when the locking members 201 contact and depress the switch 302, the container 101, 106 may be rotated such that the locking member 201 engages the locking groove 304. That is, as shown in FIG. 6, when a force $F_1$ is applied to the switch 302, the switch 302 moves downward. This downward motion causes the cam 600 on the is switch 302 to contact a switching means 501 that is connected to the motor 500 thereby powering the motor. Accordingly, depending on the intended use or application, the container 101, 106 may be depressed to activate the motor 500 for short periods of time. Alternatively, the container 101, 106 may be depressed and rotated slightly so as to allow the locking members 201 to engage the locking groove 304 to permit the continued operation of the motor 500 without requiring the user to exert constant pressure to keep the motor powered.

FIG. 7 is directed to an exemplary embodiment of the blender container 106. The blender container comprises a main body that defines a volume and a lid 104, 105 that is affixed thereto. The lid includes a plurality of openings 700 that may be used to decant the contents of the container 106 while the lid 104 remains affixed to the container 106. The blender container 106 also includes a base 110. The base is sized to fit within the recessed well 300. Also, the base is coupled to the container 106 by a screw-fit relation. The base 110 also includes an agitating means 108, as shown in FIG. 9. Turning back to FIG. 7, the blender container 106 also includes a plurality of locking members 109 spaced about the periphery of the blender container 106 near the base 110 of the container 106. As shown in the exemplary blender container 106 depicted in FIG. 7, a juicer 111 may be provided within the body of the blender container 106. As those skilled in the art will appreciate, the blender container 106 may be used without the juicer 111. The blender container 106 may include a handle 800 and a spout 801 that facilitates the decanting of the contents of the container.

Figure 10:
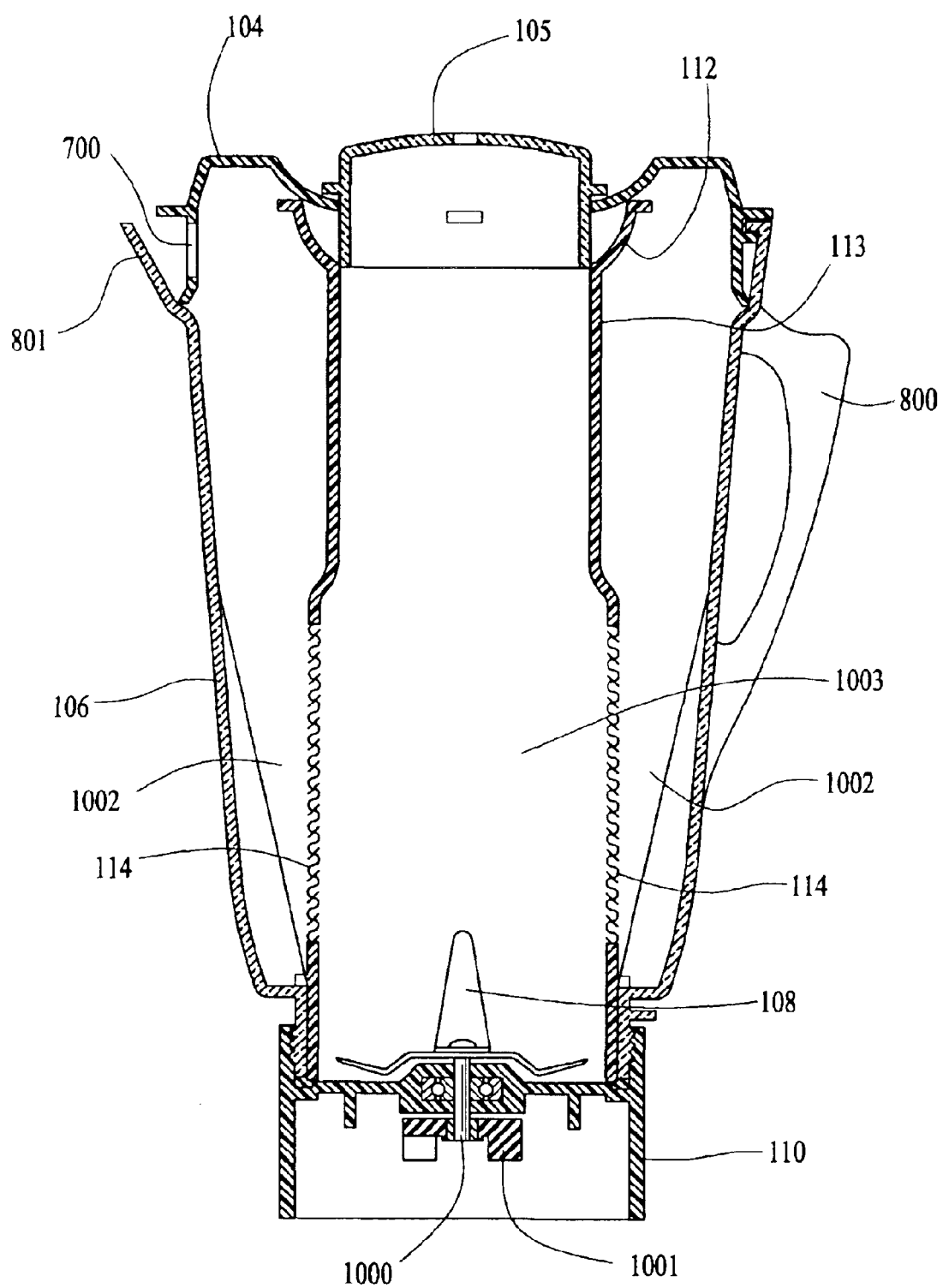
FIG. 10 is a cross-sectional view of an exemplary embodiment of blender container taken along line 10—10 of FIG. 7.

FIG. 10 illustrates the cross-sectional view of the blender container 106. The cross-sectional view shows the juicer element 111 placed within the body of the blender container 106. As shown in FIG. 10, the juicer element 111 is secured to the bottom of the blender container 106. Additionally, the bore of the juicer 111 may be accessed by removing cap element 105. In use, fruits and/or vegetables may be placed into the bore 1003 of the juicer 111. Rotation of the motor means is transmitted through shaft 1000 and mating impeller 1001 thereby transmitting a rotational force to the agitating means 108. The contents of the juicer 1003 are then blended thereby causing the resulting juice to move from the bore 1003 into the container body 1002 through the sieve elements 114. The remaining pulp is separated and trapped within the bore 1003 of the juicer 111. By providing a two-part cap 104, 105, an individual user can access the bore 1003 of the juicer 111 without removing the entire cap or stopping the machine for fear of spillage or splattering. For example, the individual user may remove cap 105 to access the bore 1003 of the juicer 111 to add more products for juice extraction. The resulting juice that is located within the space 1002 may be decanted from the container without removing the lid through the openings.

While the present invention has been described with regards to particular embodiments, it is recognized that additional variations of the present invention may be devised without departing from the inventive concept.

What is claimed is:

1. A blender system, comprising:
   a base having a means for rotating a shaft, a recessed well positioned at a top of the base, a pressure-actuated switch positioned about the periphery of the recessed well, and a locking groove;

a generally bullet-shaped container comprising a container body, a selectively removable container base, the container base sized to fit into the recessed well of the base, the container base comprising a means for agitating contents of the bullet-shaped container; the bullet-shaped container comprising a means for locking the bullet-shaped container within the recessed well of the base; and a blender container comprising a blender body, a selectively removable blender base, wherein the blender base sized to fit into the recessed well of the base, the blender container comprising a means for agitating contents of the blender container, a means for sieving the contents of the blender container, and a means for locking the blender container within the recessed well of the base.

2. The blender system of claim 1 wherein the means for agitating the contents of the bullet-shaped container comprises one or more blades.

3. The blender system of claim 1 wherein the bullet-shaped container further comprises a plurality of ridges extending from an outer surface of the container, wherein the ridges form a stable platform for standing the bullet-shaped container on a substantially flat surface.

4. A blender system, comprising:

a base having a means for rotating a shaft, a recessed well positioned at a top of the base, a pressure-actuated switch positioned about the periphery of the recessed well, and at least one locking groove;

a shaped container comprising a container body, a selectively removable container base, the container base sized to fit into the recessed well of the base, the container base comprising a mixer, the shaped container comprising one or more tabs extending from the outer diameter of the container that are engageable with the corresponding grooves provided on the wall of the recessed well; and a blender container comprising a blender body, a selectively removable blender base, wherein the blender base sized to fit into the recessed well of the base, the blender container comprising a blender mixer, a sieve, and one or more tabs extending from the outer diameter of the blender container that are engageable with the corresponding grooves provided on the wall of the recessed well.

5. The blender system of claim 4 wherein the mixers each comprise one or more blades.

6. The blender system of claim 4 wherein the shaped container further comprises a plurality of ridges extending from an outer surface of the container, wherein the ridges form a stable platform for standing the shaped container on a substantially flat surface.

* * * * *